May 14, 1929.  E. H. W. WEIBULL  1,713,064
MECHANICAL MOVEMENT
Filed Dec. 14, 1926
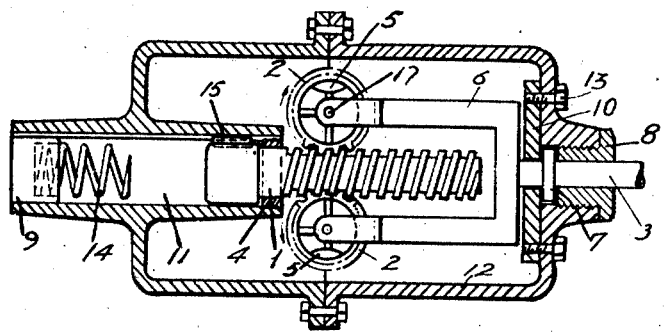
INVENTOR
ERNST HJALMAR WALODDI WEIBULL
BY
ATTORNEY Patented May 14, 1929.

UNITED STATES PATENT OFFICE.

ERNEST HJALMAR WALODDI WEIBULL, OF STOCKHOLM, SWEDEN.

MECHANICAL MOVEMENT.

Application filed December 14, 1926, Serial No. 154,842, and in Sweden December 15, 1925.

The present invention has for its object a hammering or striking tool in which a rotary motion is converted into a reciprocating striking or hammering movement by utilizing the centrifugal force.

In the accompanying drawing a constructional form of the invention is illustrated.

1 designates a reciprocating body or spindle, which is guided axially in guides 11 in the frame 12 of the device. The movement of this spindle in the one direction is limited by a stop 4 in the frame and in the other direction by a striking or hammering body 9 which is movable in the guide 11 and may or may not be provided with a spring 14, by means of which the blow can be transmitted.

The spindle 1, which is prevented from turning in the guide 11 by means of a rib 15, consists of a screw spindle, cooperating with two diametrically opposed worm wheels 2, which are loaded eccentrically by means of weights 5 and mounted in a support 6. This support is fixed upon a non-reciprocating, but revoluble driving shaft 3, arranged axially in relation to the spindle 1. For preventing the shaft 3 from reciprocating it is provided with a flange 7 which is enclosed between a bearing 8, threaded into the frame 12 and a plate 10 connected to the frame 12 by means of bolts 13.

This form of the device operates in the following manner: It is assumed that the body 1 is in the position immediately after the transmission of a blow to the body 9. By the further revolution of the shaft 3 the members 2 are given a revolving motion around the axis of that shaft, thereby under the action of the centrifugal force striving to maintain themselves in the position illustrated in Fig 5, that is, in a farthest position of the load 5 from the spindle 1. As long as it is possible for the spindle 1 to be moved to the right, the wheels 2 for that reason will become stationary in relation to the support 6, serving as a nut screwed upon the body or spindle 1, thereby causing the latter to move to the right until its head-end strikes the stop 4 on the right end of the guide 11. The movement of the spindle 1 thereby is stopped and the members 2 now at the continued revolution of the support 6 are caused to rotate on their own axes 17 in the direction of the arrows at a corresponding speed without having any effect on the spindle 1. However, when the eccentrically situated loads 5 on the wheels 2 reach a position nearest to the spindle 1, the centrifugal force will throw the load 5 to a position farthest from the spindle 1 causing the wheels 2 to rotate about their axes 17 at a speed greater than the above mentioned speed, thereby causing the spindle 1 to move to the left, delivering a blow. The said wheels 2 thus work as toothed wheels rolling upon the spindle 1 as a toothed rack, whereby the spindle is rapidly moved to the left viz given a striking movement, which is transmitted to the body 9 at the end of the said movement. When this movement is finished and the wheels 2 have been brought back to their position farthest from the spindle the operation is repeated.

What I claim is:

1. A device of the character described comprising a body mounted for reciprocal movement, a rotatable member cooperating with said body, a load eccentrically located on said member, means for revolving said member about the axis of the body to move said body in one direction and a stop for limiting the movement of the body in the said direction, so that further revolution of the member about the axis of the body will rotate said member about its own axis at a corresponding speed into a position, where the eccentrically located load under the action of centrifugal force will cause a further rotation of the member about its own axis at a greater speed than the above mentioned corresponding speed, causing the body to move in the opposite direction to deliver a blow.

2. A device of the character described comprising a body mounted for reciprocal movement, a toothed wheel engaging said body, a load eccentrically located on said wheel, means for revolving said wheel about the axis of the body to move said body in one direction because of the engagement therewith of the toothed wheel, and a stop for limiting the movement of the body in the one direction so that further revolution of the toothed wheel about the axis of the body will rotate said wheel about its own axis at a corresponding speed into a position where the eccentrically-located load under the action of centrifugal force will cause a further rotation of the wheel about its own axis at a greater speed than the above mentioned corresponding speed causing the body to move in the opposite direction to deliver a blow.

3. A device of the character described comprising a screw spindle and mounted for reciprocal movement, a toothed wheel meshing with said screw spindle, a load eccentrically located on said toothed wheel, means for revolving said wheel about the axis of said spindle to move said spindle in one direction because of the meshing therewith of the toothed wheel, and a stop for limiting the movement of the spindle in the one direction, so that further revolution of the toothed wheel about the axis of the spindle will rotate said wheel about its own axis at a corresponding speed into a position where the eccentrically-located load under the action of centrifugal force will cause a further rotation of the wheel about its own axis at a greater speed than the above mentioned corresponding speed, causing the spindle to move in the opposite direction to deliver a blow.

4. A device of the character described comprising a screw spindle provided with a head and mounted for reciprocal movement, a toothed wheel meshing with said screw spindle, a load eccentrically located on said toothed wheel, a support for the toothed wheel, means for revolving the support and the wheel about the axis of the spindle to move said spindle in one direction because of the meshing therewith of the toothed wheel, and a stop for engaging the head and limiting the movement of the spindle in the one direction so that further revolution of the support about the axis of the spindle will rotate said wheel about its own axis at a corresponding speed into a position where the eccentrically-located load under the action of centrifugal force will cause a further rotation of the wheel about its own axis at a greater speed than the above mentioned corresponding speed, causing the spindle to move in the opposite direction to deliver a blow.

ERNST HJALMAR WALODDI WEIBULL.